(12) United States Patent
Melin et al.

(10) Patent No.: US 11,660,569 B2
(45) Date of Patent: May 30, 2023

(54) METHOD AND APPARATUS FOR PURIFYING GAS

(71) Applicant: TEKNOLOGIAN TUTKIMUSKESKUS VTT OY, Espoo (FI)

(72) Inventors: Kristian Melin, Espoo (FI); Pekka Simell, Espoo (FI); Esa Kurkela, Espoo (FI); Marjut Suomalainen, Espoo (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 213 days.

(21) Appl. No.: 16/610,157

(22) PCT Filed: May 9, 2018

(86) PCT No.: PCT/FI2018/050350
§ 371 (c)(1),
(2) Date: Nov. 1, 2019

(87) PCT Pub. No.: WO2018/206850
PCT Pub. Date: Nov. 15, 2018

(65) Prior Publication Data
US 2020/0078730 A1      Mar. 12, 2020

(30) Foreign Application Priority Data
May 9, 2017    (FI) .................................... 20175414

(51) Int. Cl.
*B01D 53/75*    (2006.01)
*B01D 53/14*    (2006.01)
(Continued)

(52) U.S. Cl.
CPC ......... *B01D 53/75* (2013.01); *B01D 53/1406* (2013.01); *B01D 53/1475* (2013.01);
(Continued)

(58) Field of Classification Search
CPC ................ B01D 53/75; B01D 53/1406; B01D 53/1475; B01D 53/1493; B01D 5/18;
(Continued)

(56) References Cited

U.S. PATENT DOCUMENTS 3,780,499 A    12/1973   Dorr et al.
6,352,414 B1    3/2002   Popov
(Continued)

FOREIGN PATENT DOCUMENTS

CN    101628845 B    2/2013
CN    106457136 A    2/2017
(Continued)

OTHER PUBLICATIONS

International Search Report for PCT/FI2018/050350 prepared by the European Patent Office, dated Oct. 16, 2018, 6 pages.
(Continued)

*Primary Examiner* — Anita Nassiri-Motlagh
(74) *Attorney, Agent, or Firm* — Brooks Kushman P.C.; John E. Nemazi

(57) ABSTRACT

A method and apparatus for purifying gas where gas is treated in a multistage treatment having at least two ejector stages, a motive medium including liquid, steam or gaseous agent at high pressure injected by an ejector of the ejector stage, and the gas is sucked into the same ejector and mixed with the motive medium for forming a mixture, at least a part of gas and/or liquid phase of the mixture is supplied to a second ejector stage having so that a second motive medium which includes liquid, steam or gaseous agent is injected to the ejector and the gas and/or the liquid phase is sucked into the same ejector in which the gas and/or liquid phase is mixed with the second motive medium for forming a second
(Continued)

mixture, at least one of the mixtures includes an additive for removing impurities of the gas, and a purified gas is formed.

11 Claims, 8 Drawing Sheets

(51) Int. Cl.
 *B01D 53/18* (2006.01)
 *B01D 53/62* (2006.01)
 *B01D 53/78* (2006.01)
(52) U.S. Cl.
 CPC ......... *B01D 53/1493* (2013.01); *B01D 53/18* (2013.01); *B01D 53/62* (2013.01); *B01D 53/78* (2013.01); B01D 2251/304 (2013.01); B01D 2251/606 (2013.01); B01D 2252/103 (2013.01)
(58) Field of Classification Search
 CPC ...... B01D 5/62; B01D 5/78; B01D 2251/304; B01D 2251/606; B01D 2252/103
 USPC ........................................................ 423/232
 See application file for complete search history.

(56) References Cited

U.S. PATENT DOCUMENTS

| | | | |
|---|---|---|---|
| 6,849,105 | B2 | 2/2005 | Baudry et al. |
| 7,018,451 | B1 * | 3/2006 | Torkildsen ............ B01F 25/433 95/216 |
| 2003/0101869 | A1 | 6/2003 | Baudry et al. |
| 2008/0250715 | A1 | 10/2008 | Cooper et al. |
| 2015/0251129 | A1 | 9/2015 | Heirman et al. |

FOREIGN PATENT DOCUMENTS

| | | |
|---|---|---|
| DE | 2050580 A1 | 4/1972 |
| GB | 124912 A | 4/1919 |
| WO | 2005028982 A1 | 3/2005 |
| WO | 2011109359 A1 | 9/2011 |
| WO | 2015176180 A1 | 11/2015 |

OTHER PUBLICATIONS

Finnish Patent and Registration Office Search Report prepared by the Finnish Patent Office, dated Nov. 29, 2017, 1 page.

* cited by examiner

METHOD AND APPARATUS FOR PURIFYING GAS

CROSS-REFERENCE TO RELATED APPLICATION

This application is the U.S. national phase of PCT Application No. PCT/FI2018/050350 filed on May 9, 2018, which claims priority to FI Patent Application No. 20175414 filed on May 9, 2017, the disclosures of which are incorporated in their entirety by reference herein.

FIELD OF THE INVENTION

The invention relates to a method and an apparatus for treating and pressurizing gas.

BACKGROUND OF THE INVENTION

Known from the prior art is to produce biomass based products and synthesis gases by means of gasification. A problem of the production by the gasification is high capital and production cost. A major share of the investment costs is due to compressors and gas purification equipment. The gasification process comprises many compressors, multistage compressors, water wash devices and gas absorbers to remove acid gases and impurities and regenerators to regenerate absorption liquids. It is known from the prior art to use a separate compressor to increase pressure of the gas to synthesis pressure and to treat the gas by means of separate gas purification steps including water wash, sulfur removal and other purification steps. The synthesis gas or flue gas can be purified from sulfur by absorption or by scrubbing with a chemical compound. The water wash can be used to remove ammonia. Typically, the compressor and purification stages are very expensive, and therefore it is difficult to use the multistage purification and compression process in small scale plants. Further, the compressor requires cooled vapor free of solids above its dew point so that liquid droplets are not present. Further, carbon dioxide and hydrogen sulphide removal causes also high costs in small scale plants.

OBJECTIVE OF THE INVENTION

The objective of the invention is to disclose a new type method and apparatus for purification of gases from different processes, such as processes using biomass and waste as feedstock. Further, the objective of the invention is to remove impurities, such as carbon dioxide or other impurities, from the gas. Further, the objective of the invention is to disclose a new type method and apparatus for pressurisation of gas in different processes. Further, the objective of the invention is to pressurize the gas economically. Further, the objective of the invention is to purify the gas simultaneously in connection with the pressurisation of the gas.

SUMMARY

The method and apparatus according to the invention are characterized by what has been presented in the claims.

BRIEF DESCRIPTION OF THE DRAWINGS

The accompanying drawings, which are included to provide a further understanding of the invention and constitutes a part of this specification, illustrate some embodiments of the invention and together with the description help to explain the principles of the invention. In the drawings.

DETAILED DESCRIPTION

Figure 1:
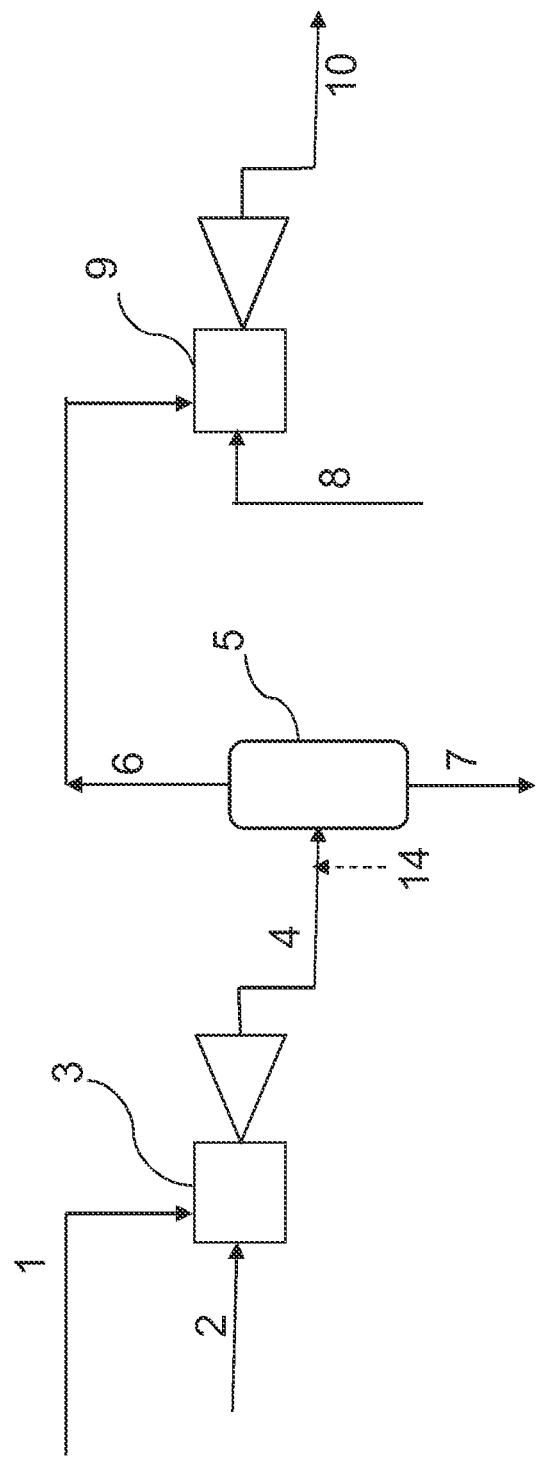
FIG. 1 is a flow chart illustration of a method according to one embodiment.

The invention is based on a method for purifying gas and also for pressurizing gas. In the method, a gas (1) is treated in a multistage treatment comprising at least two ejector stages (3,9,34), a motive medium (2) which comprises liquid, steam or gaseous agent at high pressure is injected to at least one ejector of the ejector stage (3), and the gas (1) is sucked into the same ejector in which the gas is mixed with the motive medium for forming a mixture (4) comprising at least gas phase and in one embodiment also liquid phase, at least a part of the gas phase (6) of the mixture (4) and/or the liquid phase (7) of the mixture (4) is supplied to a next, such as to a second or later, ejector stage (9,34) which comprises at least one ejector so that a second or later motive medium (8,35) which comprises liquid, steam or gaseous agent, in one embodiment at high pressure, is injected to the ejector and the gas phase (6) and/or the liquid phase (7) is sucked into the same ejector in which the gas phase and/or liquid phase is mixed with the second or later motive medium for forming a second or later mixture (10,36), at least one of the mixtures (4,10,36) comprises an additive for removing impurities of the gas (1) and the gas is purified for forming a purified gas and preferably the purified gas is recovered. Preferably, the gas is compressed by the motive medium (2,8,35) in the ejectors so that pressure of the gas is increased to a first pressure level in the first ejector stage (3) and pressure of the gas is increased from the previous pressure level to a second or later pressure level in the second or later ejector stage (9,34). In one embodiment, the gas (1) and/or the motive medium (2) comprises at least one impurity which is removed. In one embodiment, the gas (1) and/or the motive medium (2) comprises at least carbon dioxide. In one embodiment, the gas (1) comprises at least carbon dioxide as an impurity and the gas is treated in a multistage treatment comprising at least two ejector stages (3,9,34).

One embodiment of the method is shown in FIG. 1. Another embodiments of the method are shown in FIGS. 2-8.

The apparatus comprises at least two ejector stages (3,9, 34) and each ejector stage comprises at least one ejector, at least one feeding device (19), such as an injecting device, for injecting a motive medium (2) which comprises liquid, steam or gaseous agent at high pressure to at least one ejector of the ejector stage (3), and at least one supplying device, e.g. sucking equipment, for sucking the gas (1) into the same ejector in which the gas (1) is mixed with the motive medium (2) for forming a mixture (4), at least one second feeding device (24), such as an injecting device, for injecting a second or later motive medium (8,35) which comprises liquid, steam or gaseous agent, in one embodiment at high pressure, to a second or later ejector stage (9,34) which comprises at least one ejector, and at least one gas phase or liquid phase supplying device, e.g. second sucking equipment, for supplying, such as sucking, at least a part of the gas phase (6) and/or liquid phase (7) of the mixture (4) to the same ejector in which the gas phase (6) and/or liquid phase (7) is mixed with the second or later motive medium (8,35) for forming a second or later mixture (10,36), and at least one addition device for adding an additive for removing impurities of the gas (1) to at least one of the mixtures (4,10,36). Further, in a preferred embodiment, a purified gas is recovered after the ejector stages.

In this context, the gas means any gas which can be purified and pressurized by means of ejectors and motive medium. Preferably, a purified gas is recovered.

In one embodiment, the gas (1) is biomass derived gas, biogas, gas from biomass pyrolysis, synthesis gas, flue gas, hydrogen containing gas, gasification gas, fermentation gas, gas which comprises carbon dioxide, gas from biomass treating process, gas from black liquor process or their combination. In one embodiment, the gas (1) comprises hydrogen sulphide, sulphide oxide, such as $SO_x$, nitrogen oxide, such as $NO_x$, ammonia, HCN or their combination, e.g. as an impurity. In one embodiment, the gas (1), such as gasification gas or biogas, comprises hydrogen sulphide.

In this context, the motive medium means any motive medium, motive fluid, motive stream or the like. The motive medium can be a liquid or steam or gaseous agent. In one embodiment, a liquid is used as the motive medium of the first ejector stage and a liquid is used as the motive medium of the second ejector stage. In one embodiment, a liquid is used as the motive medium of the first ejector stage and a steam is used as the motive medium of the second ejector stage. In one embodiment, a steam is used as the motive medium of the first ejector stage and a steam is used as the motive medium of the second ejector stage. In one embodiment, a steam is used as the motive medium of the first ejector stage and a liquid is used as the motive medium of the second ejector stage.

In one embodiment, the motive medium (2,8,35) is selected from the group comprising water based liquid, water solution, water based steam, water, ethanol, methanol, light hydrocarbons, hexane, liquid gas, solvent, hydrogen, air, other stripping gas or their combination. In one embodiment, the motive medium is a liquid. In one embodiment, the motive medium is steam. In one embodiment, the motive medium is gaseous agent. In one embodiment, the motive medium (2,8,35) is a compound which is easy to vaporize. Then, the vaporizing requires less energy. Preferably, the motive medium is selected so that it can be condensed in connection with the separating, or before or after the separating, or alternatively after the ejector stage. In one embodiment, high pressure liquid is used as motive medium (2) in the first ejector stage (3). In one embodiment, liquid or high pressure liquid is used as motive medium (8,35) in the second or later ejector stage (9,34). In one embodiment, steam or high pressure steam is used as motive medium (8,35) in the second or later ejector stage (9,34). In one embodiment, gaseous agent or high pressure gaseous agent is used as motive medium (8,35) in the second or later ejector stage (9,34). In one embodiment, high pressure steam is used as motive medium (2) in the first ejector stage (3). In one embodiment, the high pressure steam is generated from process heat. In one embodiment, the motive medium (2,8,35) is vaporized before the ejector stage (3,9,34). In one embodiment, the motive medium is vaporized by process heat.

The motive medium (2,8,35) can be fed or supplied by means of a feeding device to the ejector stage (3,9,34). In this context, the feeding device can be any feeding device, equipment or other suitable device for supplying the motive medium to the ejector stage. In one embodiment, the feeding device is selected from the group comprising pump, tube, pipe and their combinations.

In one embodiment, the pressure of the motive medium (2,8,35) is 1.3-100 bar, preferably 1.3-50 bar, in one embodiment 1.5-15 bar, and in one embodiment 2-10 bar, if the motive medium is liquid, e.g. in the first or second or later ejector stage (3,9,34). In one embodiment, the pressure of the motive medium (2,8,35) is 3-300 bar, in one embodiment 20-100 bar, in one embodiment 50-100 bar if the motive medium is steam, e.g. in the first, second or later ejector stage (3,9,34). Preferably high pressure is used as a pressure of the motive medium. When high pressure is used in the motive medium then the pressure of the gas or gas phase can be increased and the mixing between the motive medium and the gas can be improved.

In this context, the mixture (4,10,36) after the ejector stage (3,9,34) means any the mixture which has been formed in an ejector stage and which comprises at least gas components and optionally also liquid components. In one embodiment, the mixture (4) comprises liquid phase and gas phase after the ejector stage (3), such as after the first ejector stage. In one embodiment, the mixture, e.g. the first mixture (4), is cooled or condensed after the ejector stage, and then the mixture comprises liquid phase and gas phase. In one embodiment, the second or later mixture (10,36) comprises at least gas phase after the second or later ejector stage (9,34). In one embodiment, the second or later mixture (10,36) comprises liquid phase and gas phase. In one embodiment, the mixture, e.g. the second or later mixture (10,36), is cooled or condensed after the ejector stage, and then the mixture comprises liquid phase and gas phase. Preferably, the mixture is a two-phase flow. In one embodiment, the mixture comprises the liquid phase, such as liquid, and gas phase, such as vapor. In one embodiment, the mixture comprises motive medium, gas component and carbon dioxide. In one embodiment, the mixture comprises vapor 1-90% by volume and liquid 99-10% by volume. In one embodiment, the mixture comprises vapor 30-70% by volume, in one embodiment 30-50% by volume, in one embodiment about 40% by volume, and liquid 30-70% by volume, in one embodiment 50-70% by volume, in one embodiment about 60% by volume.

In this context, the gas phase means any gas phase, vapor stream or the like. In one embodiment, the gas phase can be separated from the mixture (4,10,36). The gas phase can consists of one or more gas fractions. The gas phase can be separated from the mixture as one fraction or as more fractions.

In this context, the liquid phase means any liquid phase, liquid stream or the like. In one embodiment, the liquid phase can be separated from the mixture (4,10,36). The liquid phase can comprises one or more components. In one embodiment, the liquid phase comprises also gas fraction or gas fractions. In one embodiment, the liquid phase (7) after the first separation stage (5) is a carbon dioxide rich liquid. In one embodiment, the liquid phase (13) after the second separation stage (11) is a carbon dioxide saturated liquid.

In this context, the ejector means any ejector, injector, eductor device, eductor-jet pump, liquid jet gas pump, pump-like device without moving parts or their combination which can preferably act as a two-phase flow ejector. Preferably, the ejector is an ejector device without moving parts. The ejector can be a liquid motivated ejector, vapor ejector, steam motivated ejector, condensing ejector or their combination. Preferably, the ejector works so that a stream with high pressure is injected to a nozzle where the diameter reduces. As the velocity of the stream increases in the nozzle its pressure reduces. In the troat with high velocity the pressure is so low that another stream can be sucked in. The combined stream then goes to a section with increasing diameter. Here the velocity reduces and the pressure increases. The result is that the pressure at the outlet is intermediate between the motive medium and suction streams. Another feature of the ejector is that the gas and liquid mass transfer is very fast due to intense mixing and small bubbles formed. Therefore, the absorption of gas can be done simultaneously and not require large size equipment.

In one embodiment, the ejector is a two-phase flow ejector. In one embodiment, the ejector is a liquid motivated ejector. In one embodiment, the ejector is a vapor ejector, such as a steam motivated ejector. In one embodiment, the ejector of the first ejector stage (3) is a liquid motivated ejector. In one embodiment, the ejector of the second or later ejector stage (9,34) is a liquid motivated ejector. In one embodiment, the ejector of the second or later ejector stage (9,34) is a vapor ejector, such as a steam motivated ejector. In one embodiment, the ejector of the first ejector stage (3) is a vapor ejector, such as a steam motivated ejector. In one embodiment, the ejector of the first ejector stage (3) is a liquid motivated ejector and the ejector of the second or later ejector stage (9,34) is a vapor ejector. In one embodiment, the ejector of the first ejector stage (3) is a liquid motivated ejector and the ejector of the second or later ejector stage (9,34) is a liquid motivated ejector. In one embodiment, the ejector of the first ejector stage (3) is a vapor ejector and the ejector of the second or later ejector stage (9,34) is a vapor ejector. In one embodiment, the ejector of the first ejector stage (3) is a vapor ejector and the ejector of the second or later ejector stage (9,34) is a liquid motivated ejector.

In one embodiment, the gas is purified by washing, preferably with water or water based liquid, in the ejector stage.

In one embodiment, the method and apparatus comprise two or more than two ejector stages. In one embodiment, the method and apparatus comprise two ejector stages. In one embodiment, the method and apparatus comprise 2-8 ejector stages. In one embodiment, the ejector stage, such as the first, second or later stage, comprises at least one ejector. In one embodiment, the ejector stage, such as first, second or later stage, comprises two or more than two ejectors. In one embodiment, the ejectors are arranged in parallel. In one embodiment, the ejectors are arranged sequentially.

In one embodiment, at least a part of the gas phase of the mixture (4,10,36) is supplied from the previous ejector stage to the next ejector stage. In one embodiment, the gas (1) is supplied to a first ejector stage (3) which comprises at least one ejector and the gas is treated in the first ejector stage for forming a first mixture (4) which comprises at least gas phase, and the gas phase (6) from the first ejector stage (3) is supplied to a second ejector stage (9) which comprises at least one ejector and the gas phase is treated in the second ejector stage for forming a second mixture (10). In one embodiment, the gas phase (12) from the second ejector stage (9) is supplied to a third or later ejector stage which comprises at least one ejector and the gas phase is treated in the third or later ejector stage for forming a third or later mixture. In one embodiment, the gas phase is supplied from the second ejector stage to at least one next ejector stage. In one embodiment, a part of the gas phase may be recovered or recirculated. In one embodiment, a part of the gas phase may be discharged.

In one embodiment, at least a part of the liquid phase of the mixture (4,10,36) is supplied from the previous ejector stage to the next ejector stage. In one embodiment, the gas (1) is supplied to a first ejector stage (3) which comprises at least one ejector and the gas is treated in the first ejector stage for forming a first mixture (4) which comprises at least liquid phase, and the liquid phase (7) from the first ejector stage (3) is supplied to a second ejector stage (9) which comprises at least one ejector and the liquid phase is treated in the second ejector stage for forming a second mixture (10). In one embodiment, the liquid phase (7,13) from the first or second ejector stage (3,9) is supplied to a third or later ejector stage which comprises at least one ejector and the liquid phase is treated in the third or later ejector stage for forming a third or later mixture. In one embodiment, a part of the liquid phase may be recovered or recirculated. In one embodiment, a part of the liquid phase may be discharged.

In one embodiment, the gas is compressed by the motive medium (2,8,35) in the ejectors so that pressure of the gas is increased to a first pressure level in the first ejector stage (3) and pressure of the gas is increased from the previous pressure level to a second or later pressure level in the second or later ejector stage (9,34).

In one embodiment, the pressure is increased step by step in different ejector stages, such as in the first and second ejector stages (3,9). In one embodiment, the pressure of the gas is increased from a starting pressure, e.g. from an atmospheric pressure, to 1.1.-3.0 bar in the first ejector stage (3). Preferably, there can be used low-cost ejectors in the first ejector stage. In one embodiment, the pressure of the gas is increased from the first pressure level to a final pressure level which is 2-150 bar, in one embodiment 3-100 bar. In one embodiment, the pressure of the gas is increased 1-60 bar from the first pressure level in each ejector stages. In one embodiment, the pressure of the gas is increased 1.1-3 bar from the starting pressure in the first ejector stage (3). In one embodiment, the pressure of the gas is increased over 3 bar, such as to 3-100 bar, in one embodiment to 10-80 bar, from the previous pressure level in the second and/or later ejector stages (9,34). In one embodiment, the pressure of the gas is increased 1.1-3 bar from the previous pressure level, e.g. in the first ejector stage (3), if the motive medium is liquid. In one embodiment, the pressure of the gas is increased 1.1.-100 bar, preferably 1.5-60 bar, from the previous pressure level, e.g. in the first ejector stage (3), if the motive medium is steam.

In one embodiment, the pressure of the mixture (4,10,36) or the gas phase (6,12) can be increased by means of an additional compressor after the first ejector stage (3) or the second or later ejector stage (9,34). Then pure gas can be fed to the compressor and power need of the compressor is lower. Also the cheaper compressors and compressors with smaller capacity can be used in the process.

In one embodiment, the mixture (4,10,36) can be cooled and/or condensed after the ejector stage (3,9,34), especially if steam is used as the motive medium in the ejector stage. In one embodiment, the mixture (4) is cooled and/or condensed after the first ejector stage (3). In one embodiment, the mixture (10,36) is cooled and/or condensed after the second or later ejector stage (9,34).

In one embodiment, the apparatus comprises a pipe or tube, preferably a long pipe or tube, which has enough residence time to allow dissolving or desorbing a desired part of the gas into the liquid or to allow transferring a desired part of impurity of liquid to the gas and through which the mixture (4,10,36) flows after the ejector stage (3,9,34). In one embodiment, the mixture (4,10,36) is arranged to flow with enough residence time to allow dissolving or desorbing a desired part of the gas into the liquid after the ejector stage (3,9,34). In one embodiment, the mixture (4,10,36) is arranged to flow with enough residence time to allow dissolving or desorbing a desired part from the liquid after the ejector stage (3,9,34).

In one embodiment, the method and apparatus comprise at least one separation stage (5,11,42) for separating at least a part of the gas phase (6,12,43) from the mixture (4,10,36) which comprises preferably liquid and gas phases or which has been condensed. In one embodiment, the method and apparatus comprises more than one separation stages (5,11, 42). In one embodiment, the method and apparatus comprises at least two separation stages (5,11,42). In one embodiment, the method comprises at least one separation stage (5,11,42) after at least one ejector stage (3,9,34). In one embodiment, the method comprises at least one separation stage after each ejector stage. In one embodiment, the method comprises at least one separation stage after the last ejector stage. In one embodiment, the method comprises at least one separation stage (5) after at least the first ejector stage (3).

In one embodiment, the separation stage comprises at least one separation device. In one embodiment, the separation stage comprises more than one separation devices. In one embodiment, the apparatus comprises at least one separation device (5,11,42) for separating at least a part of the gas phase (6,12,43). In one embodiment, at least one separation device is arranged after each ejector of the ejector stage. As the separation device can be used any suitable separation device, washing device, separator, or other suitable device for separating. In one embodiment, the separation device is a vapor-liquid separator.

In one embodiment, at least a part of the gas phase (6) is separated from the mixture (4) which comprises preferably liquid and gas phases after the ejector stage or which is condensed before the separation. In one embodiment, at least a part of the gas phase (12,43) of the second or later mixture (10,36) is separated from the mixture (10,36) which comprises preferably liquid and gas phases after the ejector stage or which is condensed before the separation. In one embodiment, at least a part of the gas phase (6,12,43) is separated from the mixture (4,10,36) in the separation stage (5,11,42). In one embodiment, the apparatus comprises at least one separation device (5), such as a first separation device, for separating at least a part of the gas phase (6) from the mixture (4). In one embodiment, the apparatus comprises at least one second or later separation device (11,42) for separating at least a part of the gas phase (12,43) of the second or later mixture (10,36).

In one embodiment, the first mixture (4) of the liquid phase and gas phase is supplied to a first separation stage (5) arranged after the first ejector stage (3), and the liquid phase (7) and the gas phase (6), preferably at least a part of the gas phase, are separated in said separation stage. In one embodiment, the second mixture (10) of the liquid phase and gas phase is supplied to a second separation stage (11) arranged after the second ejector stage (9), and the liquid phase (13) and the gas phase (12) are separated in said separation stage. In one embodiment, the mixture (4,10) is cooled and/or condensed before the separation stage (5,11). In one embodiment, the first or second mixture (4,10) is condensed after the first or second ejector stage (3,9). In one embodiment, the first or second mixture (4,10) is condensed after the ejector stage (3,9), and the condensed mixture is supplied to a separation stage (5,11). In one embodiment, the apparatus comprises at least one condenser for condensing the mixture (4,10) after the ejector stage (3,9). In one embodiment, the second mixture (10) is washed by glycol. In one embodiment, at least a part of the liquid phase (7,13,44) separated in the separation stage (5,11,42) is fed as the motive medium to the ejector stage (3,9,34), preferably to the same ejector stage. In one embodiment, the liquid phase (7,13,44) is supplied to the feeding device (19,24). In one embodiment, the liquid phase (7,13,44) is supplied directly to the ejector stage (3,9,34). In one embodiment, the liquid phase (7,13) is vaporized before the ejector stage (3,9). In one embodiment, at least a part (33) of the gas phase (12) separated in the second separation stage (11) is recirculated back to the second ejector stage (9) or a reactor (32) arranged in connection the second ejector stage (9).

In one embodiment, at least a part of the mixture (4,10,36) or the gas phase (6) or liquid phase (7) separated in the first separation stage is supplied via at least one reactor (30,31, 32) in which the mixture or phase is treated for forming a chemical compound and/or for improving a recovery of a desired component, such as a desired compound or fraction. In one embodiment, the apparatus comprises at least one reactor for treating the mixture (4,10,36) or the gas phase (6) or liquid phase (7) in order to form a chemical compound and/or improve a recovery of a desired component. In one embodiment, at least a part of the first mixture (4) is supplied via at least one reactor (30) in which the mixture is treated before the first separation stage (5). In one embodiment, at least a part of the second or later mixture (10,36) is supplied via at least one reactor (31) in which the mixture is treated before the separation stage. In one embodiment, at least a part of the gas phase (6) separated in the first separation stage (5) is supplied via at least one reactor (32) in which the gas phase is treated before the second ejector stage (9).

In one embodiment, the liquid phase (7,13) is treated for removing $CO_2$ and other impurities from the liquid phase. In one embodiment, the liquid phase (7,13) is treated by means of a regeneration (37,40).

Any suitable reactor known per se can be used as a reactor in the method according to the invention. Preferably, the reactor can be microbiological reactor, chemical reactor, Fischer-Tropsch type reactor, hydrodeoxygenation reactor, regeneration reactor, other suitable reactor or their combination. In one embodiment, the microbiological reactor is used to treat the first mixture (4) of the liquid phase and gas phase. In one embodiment, methane, methanol, ethanol and/or organic acids are formed from the first mixture (4) in the reactor (30). In one embodiment, the chemical reactor or the Fischer-Tropsch type reactor is used as the reactor (31) to treat the second mixture (10) and to form a desired chemical compound. In one embodiment, the regeneration reactor or regeneration stage (37,40) is used to treat the liquid phase (7,13) and to form a desired chemical compound and/or to remove $CO_2$ or other impurities. Preferably, the mixture of the liquid phase and gas phase comprises small bubbles after the ejector stage and therefore the gas component dissolves effectively to liquid before the reactor and the reaction rate can be enhanced in mass transfer limited reactions. In one embodiment, the chemical compound formed in the reactors can be recovered and/or recirculated. In one embodiment, the chemical reactor is used to treat the gas phase (6) separated in the first separation stage. In one embodiment, methanol and optionally other organic compounds are formed from the gas phase (6) in the reactor (32). In one embodiment, the liquid phase comprises methanol after the second ejector stage (9) and/or after the second separation stage (11). In the methanol production, a part of the separated gas phase (12) can be recirculated back to the reactor (32) or the second ejector stage (9), and another part of the separated gas phase (12) can be discharged out from the process. In one embodiment, the methanol compound is recovered from the liquid phase (13) after the second separation stage (11), e.g. in an additional treatment stage (21).

Preferably, the additive for removing impurities is arranged into the mixtures (4,10,36) and/or liquid phases (7,13,44). It is important that at least one mixture, after at least one ejector stage, comprises the additive for facilitating the remove of the impurities. In one embodiment, an additive is added for increasing a bonding of desired impurities to a liquor and/or increasing a capture of desired impurities in each separation stage (5,11,42). In one embodiment, the additive comprises at least carbonate compound. In one embodiment, the additive comprises a compound which is selected from the group comprising sodium carbonate, potassium carbonate, sodium bicarbonate, amines, methanol, dimethyl ethers of polyethylene glycol (DEPG), ammonium carbonate, ammonia, other additives or their combinations. In one embodiment, the additive comprises sodium carbonate. In one embodiment, one of the mixtures (4,10,36) comprises the additive. In one embodiment, at least two mixtures (4,10,36) comprise the additive. In one embodiment, one or more of the liquid phases (7,13,44) comprise the additive. In on embodiment, at least one of the motive medium (2,8,35) comprises the additive. In one embodiment, the mixture, liquid phase or motive medium comprises the additive in the form of diluted solution. In one embodiment, the additive is added in one or more steps. In one embodiment, the additive is recirculated, preferably together with the liquid phase in the ejector stage (3,9,34) or from the liquid phase to the mixture (4,10,36). In one embodiment, the additive (14,15) is added to the mixture (4,10,36). In one embodiment, the additive (14,15) is added in connection with the ejector stage (3,9,34). In one embodiment, the additive (14,15) is added before the ejector stage (3,9,34). In one embodiment, the additive (14,15) is added to the liquid phase (7,13,44) which is separated in the separation stage (5,11,42). In one embodiment, the additive (14,15) is added to the liquid phase (7,13,17,22,39,44), which is separated in the separation stage (5,11,42) and/or treated in an additional treatment stage (16,21), before the feeding device (19,24) of the motive medium. In one embodiment, the additive (14, 15) is added to the motive medium (2,8,35). In one embodiment, the gas (1) or the motive medium (2,8,35) comprises the additive. In one embodiment, the additive (14,15) is added as a make-up additive. In one embodiment, the additive (14,15) is added as the make-up additive in connection with the separation stage (5,11,42). In one embodiment, the additive (14,15) is added as the make-up additive to the liquid phase (7,13,17,22,39,44), which is separated in the separation stage (5,11,42) and/or treated in the additional treatment stage (16,21), before the feeding device (19,24) of the motive medium.

In one embodiment, a part of the liquid phase (7,13,39,44) may be recovered, preferably after the separation of the gas phase and liquid phase. In one embodiment, the liquid phase (7,13) is regenerated. In one embodiment, the liquid phase (7,13) is purified. In one embodiment, the liquid phase (7,13) is treated in an additional treatment stage (16,21,27, 37,40,45), such as by an additional separation or regeneration, after the separation stage (5,11,42) for removing and/or recovering a desired compound from the liquid phase. In one embodiment, the liquid phase is treated for removing acid gas, e.g. carbon dioxide. In one embodiment, the apparatus comprises at least one additional treatment device, such as an additional separator or regeneration device, for treating the liquid phase. In one embodiment, the additional treatment device is selected from the group comprising a separator, separation device, flash device, vapor flash device, purification device, regeneration device, crystallization device or their combinations. In one embodiment, the treatment device, such as the separator or flash device, is operated at low pressure.

In one embodiment, at least a part of the liquid phase (7,13) is fed to an additional separation stage (16,21) in which at least part of dissolved gas (18,23) is released at low pressure, e.g. about 1 bar. In one embodiment, at least a part of the liquid phase (7,13) is fed to an additional separation stage (16,21) in which at least part of dissolved gas (18,23) is released at low pressure, e.g. about 1 bar, and the pressure of the purified liquid phase (17,22) is increased and the purified liquid phase is injected as the motive medium (2,8) back to the ejector. In one embodiment, the dissolved gas (18,23) which is separated from the liquid phase (7,13) is fed from the additional separation stage (16,21) to a separate ejector. In one embodiment, the dissolved gas (18,23) which is separated from the liquid phase (7,13) is recovered. In one embodiment, the dissolved gas (18,23) which is separated from the liquid phase (7,13) is discharged out from the process. In one embodiment, a part of the purified liquid phase (17,22) is recovered after the additional separation stage (16,21).

In one embodiment, at least a part of the liquid phase (7,13,44) is recirculated back to the ejector stage without the treating in the additional separation stage or device. In one embodiment, there is not any additional treatment stage after the separation stage, e.g. after the second or later separation stage, if the motive medium, such as the second or later motive medium, is the steam. In one embodiment, a part of the liquid phase (7,13,44) is recovered.

In one embodiment, at least a part of the liquid phase (7,13,44), preferably liquid phase (7) which comprises sodium bicarbonate, is treated in an additional treatment stage (27,37,40,45) after the separation stage (5,11), preferably after the first separation stage (5) for removing or recovering sodium bicarbonate from the liquid phase. In one embodiment, the sodium bicarbonate (29) is recovered from the liquid phase flow (26) in connection with the treatment stage (27). In one embodiment, a treated flow (28) is fed to the ejector stage (3,9), to the feeding device (19,24) or to the liquid phase (7,13). In one embodiment, the treated flow (28) may comprise sodium carbonate. In one embodiment, the sodium carbonate is added to the mixture (4,10) before the separation stage. In one embodiment, the sodium bicarbonate is formed in the reactor or separation stage when carbon dioxide reacts with sodium carbonate for forming sodium bicarbonate and the liquid phase comprises sodium bicarbonate after the separation stage.

In one embodiment, at least a part of the liquid phase (7,13,44) is treated in a regeneration stage (37,40) after the separation stage (5,11), preferably after the first separation stage (5), and/or after the additional ejector stage (9,34) for removing or recovering $CO_2$ and other impurities, e.g. $H_2S$, from the liquid phase. In one embodiment, at least a part of the liquid phase (7) is treated in a regeneration stage (37,40) after the first separation stage (5). In one embodiment, at least a part of the liquid phase (13) is treated in a regeneration stage (37,40) after the second separation stage (11). In one embodiment, at least a part of the liquid phase (7,13) is treated in a regeneration stage (37,40) after the second ejector stage (9,34). In one embodiment, the regeneration stage comprises at least regeneration device, separation device or separation type device.

In one embodiment, a desired compound, e.g. an impurity, additive and/or chemical compound, is removed and/or recovered from the liquid phase. In one embodiment, the acid gas, such as the carbon dioxide, is removed after the separation stage (5,11), e.g. in the additional treatment stage (16,21) or regeneration stage (37,40). In one embodiment, the carbon dioxide is recovered. In one embodiment, the carbon dioxide is removed from the liquid phase (7) after the first separation stage (5). In one embodiment, the carbon dioxide is removed from the liquid phase (13) after the second separation stage (11). In one embodiment, the carbon dioxide is removed from the liquid phase (7,13) in the regeneration stage (37,40). In one embodiment, the carbon dioxide is reformed. In one embodiment, the carbon dioxide is pressurized. In one embodiment, hydrogen sulphide is removed and/or recovered from the liquid phase. In one embodiment, the conditions are adjusted in the first ejector stage and separation stage so that ammonia can be removed. In one embodiment, sodium bicarbonate is removed and/or recovered from the liquid phase. In one embodiment, methanol is recovered from the liquid phase, e.g. in the additional treatment stage (21).

In one embodiment, the liquid (20,25) such as water is discharged from the liquid phase (17,22), preferably before the feeding device (19,24) or the ejector (3,9,34).

In one embodiment, the pressure of the liquid phase (7,13,17,22,39,44) is increased and the liquid phase is injected as the motive medium (2,8,35) back to the ejector. In one embodiment, the pressure is increased by a pump (19,24) so that the liquid phase is pumped by a circulation pump to high pressure. In one embodiment, the liquid phase which is the motive medium (2,8,35) is vaporized before the ejector stage (3,9,34). In one embodiment, the apparatus comprises at least one vaporization device for vaporizing the liquid phase before the ejector stage.

In one embodiment, the purified gas (6,12,43) is treated, post-treated or refined after the ejector stages, such as after the last ejector stage. In one embodiment, the purified gas (6,12,43) is treated in order to form LNG (liquefield natural gas).

In one embodiment, the purified gas (12,43) is treated for forming LNG (liquefield natural gas). In one embodiment, the purified gas (12,43) is supplied to an ejector (48) of the LNG process. Further, a biogas (47) can be fed as a raw material to the LNG process. The biogas can be any biogas or gas formed biomass based material. In one embodiment, the purified gas (12,43) and the desired biogas (47) are fed to the ejector (48) of the LNG process. Alternatively, the biogas (47) is fed as a feed to an ejector (48) of the LNG process. In one embodiment, a motive medium of the ejector (48) is liquid or steam, e.g. recirculated liquid from a LNG vessel or a separation stage. In one embodiment, the purified gas and/or biogas is treated in the ejector in which a composition (49) is formed. In one embodiment, the composition is cooled and/or condensed (50) after the ejector (48). In one embodiment, the composition formed in the ejector is supplied to a gas-liquid separation (51,54) in which a gas fraction (52,55) and a liquid fraction (53,56) are separated. In one embodiment, the composition formed in the ejector is treated in one, two or more separation steps. In one embodiment, the composition formed in the ejector is treated in two separation steps, such as in a first gas-liquid separation (51) in which a gas fraction (52) and a liquid fraction (53) are separated and in a second gas-liquid separation device (54) in which a gas fraction (55) and a liquid fraction (56) are separated. In one embodiment, the formed liquid fraction (56) is supplied to a LNG vessel (57) from which LNG product (58) can be recovered. In one embodiment, a part of the LNG product, e.g. boil-off gas (60), can be recirculated to the feed of the LNG process, such as to the purified gas and/or biogas. In one embodiment, a liquid (59) from the LNG vessel can be recirculated as the motive medium to the ejector (48).

In one embodiment, the method is based on a continuous process. In one embodiment, the apparatus is a continuous apparatus. In one embodiment, the method is based on a batch process. In one embodiment, the apparatus is a batch apparatus.

In one embodiment, the method and apparatus of the present invention is used and utilized in a chemical synthesis, synthesis gas production, biofuel production, hydrogen production, methanol production, biogas upgrading process, pyrolysis process, LNG production, purification of flue gases, e.g. flue gases from pyrolysis process, carbon dioxide post capture of flue gases, gas purification of chemical synthesis, biogas purification process, gas fermentation process or in their combinations.

By means of the invention the gas can be purified effectively. By means of the invention the gas can be pressurized simply. Thanks to the invention the gas can be purified simultaneously when impurities, such as carbon dioxide, hydrogen sulphide, ammonia or the like are dissolved in the liquid. The method and apparatus of the invention offers a possibility to pressurize and purify gas streams easily and cost effectively and energy-effectively. Further, by means of the invention the mixing between the liquid and gas can be improved by the ejectors.

The present invention provides an industrially applicable, simple and affordable way to pressurize and purify the gases. The method and apparatus of the present invention is easy and simple to realize in connection with a production process, also in a small scale process. Preferably, the flow ejectors are devices without moving parts. Then more impure gases can be compressed compared to a compressor. Further, in the water wash applications, the ejector enables use of lower amount of water at high pressure. In the carbon dioxide capture, carbon dioxide can be adsorbed at high pressure reducing the need for water.

EXAMPLES

Example 1

FIG. 1 presents the process according to the invention for purifying and pressurizing the gas.

In the process, a gas (1) is treated in a multistage treatment comprising at least two ejector stages (3,9). A motive medium (2) which is high pressure liquid, such as water, is injected to a liquid motivated ejector of the first ejector stage (3) and the gas (1) is sucked into the same ejector in which the gas is mixed with the motive medium for forming a mixture (4) of liquid phase and gas phase. The mixture comprises vapor about 40% by volume and liquid about 60% by volume. At least a part of the gas phase (6) is separated from the mixture (4) in the separation stage (5) and at least a part of the gas phase (6) is supplied to a vapor ejector of the second ejector stage (9). A liquid phase (7) is recovered. A second motive medium (8) which is high pressure steam, such as water steam, is injected to the ejector and the gas phase (6) is sucked into the same ejector in which the gas phase is mixed with the second motive medium for forming a second mixture (10) comprising at least gas phase. The second motive medium (8) is vaporized before the second ejector stage (9).

The pressure of the motive medium (2) is 1.3-50 bar in the first ejector stage (3). The pressure of the motive medium (8) is 3-300 bar in the second ejector stage (9).

The apparatus comprises a long pipe or tube which has enough residence time to allow dissolving a desired part of the gas into the liquid and through which the mixture (4) flows after the ejector stage (3).

Sodium carbonate or other suitable additive is added as an additive (14) for increasing a bonding of desired impurities to a liquor and/or increasing a capture of desired impurities in the separation stage. The additive may be added the mixture (4) before the separation stage (5). Alternatively, the liquid phase comprises the additive and a make-up additive may be added before the separation stage (5).

In the process, the gas is compressed and purified by the motive medium (2,8) in the ejectors so that pressure of the gas is increased from a starting pressure to a first pressure level in the first ejector stage (3) and pressure of the gas is increased from the first pressure level to a final pressure level, such as to a synthesis gas pressure, in the second ejector stage (9). The pressure of the gas is increased from the starting pressure to 1.1-3.0 bar in the first ejector stage (3). The pressure of the gas is increased from the first pressure level to the final pressure level which is 2-150 bar. Preferably, the gas (1), or alternatively the motive medium (2), comprises carbon dioxide as an impurity. The carbon dioxide can be removed from the gas in the process.

Example 2

Figure 2:
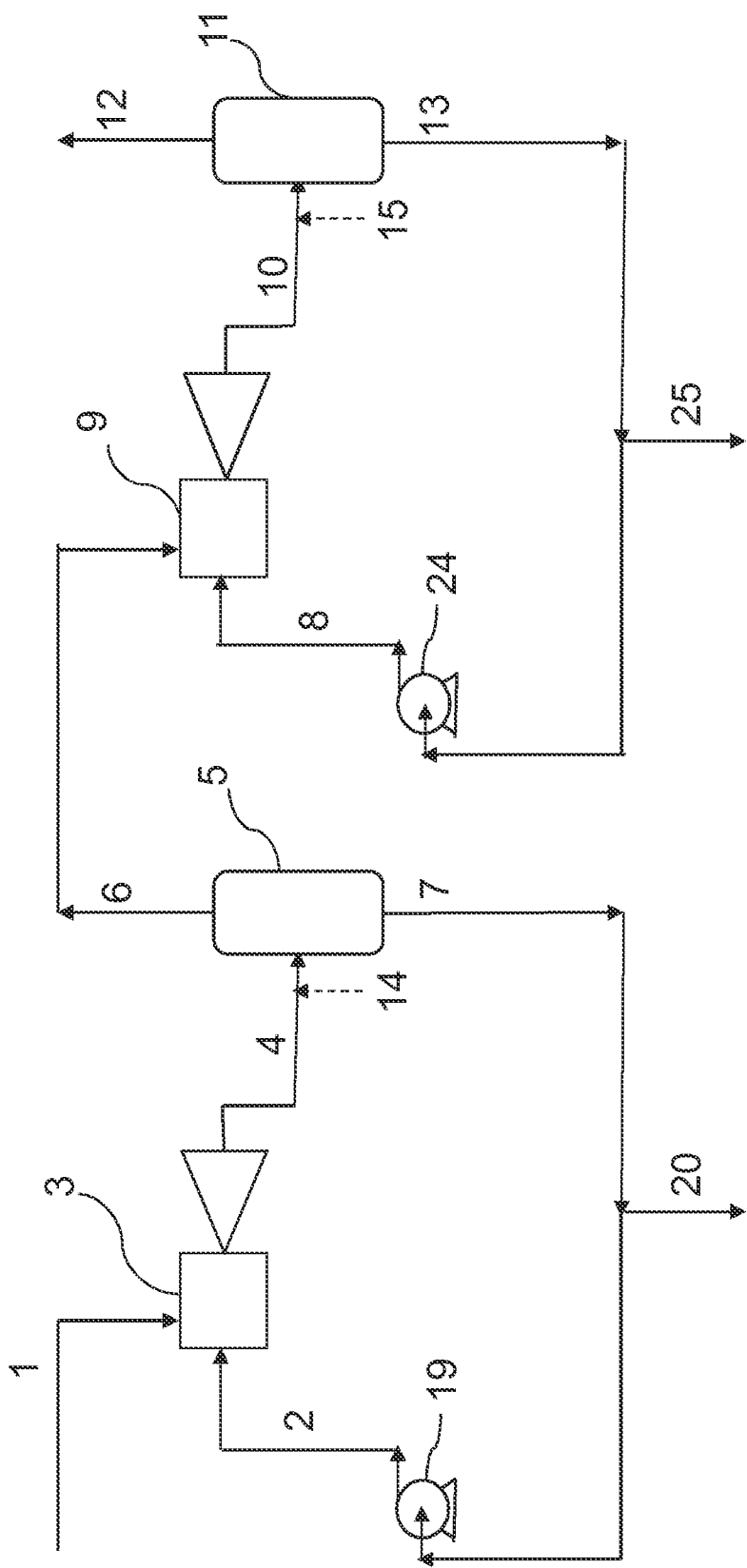
FIG. 2 is a flow chart illustration of a method according to another embodiment.

FIG. 2 presents the process according to the invention for purifying and pressurizing the gas.

In the process, a gas (1) is treated in a multistage treatment comprising at least two ejector stages (3,9). A motive medium (2) which is high pressure liquid, such as water, is injected to a liquid motivated ejector of the first ejector stage (3) and the gas (1) is sucked into the same ejector in which the gas is mixed with the motive medium for forming a mixture (4) of liquid phase and gas phase. The mixture may comprise vapor about 40% by volume and liquid about 60% by volume. At least a part of the gas phase (6) is separated from the mixture (4) in the separation stage (5) and at least a part of the gas phase (6) is supplied to a vapor ejector of the second ejector stage (9). A second motive medium (8) which is high pressure steam, such as water steam, is injected to the ejector and the gas phase (6) is sucked into the same ejector in which the gas phase is mixed with the second motive medium for forming a second mixture (10). The second mixture (10) may be condensed after the second ejector stage (9). At least a part of the gas phase (12) of the second mixture (10) is separated. The apparatus comprises at least one second separation device (11) for separating at least a part of the gas phase (12) from the second mixture (10). At least a part of the liquid phase (7,13) separated in the first or second separation stage (5,11) is fed as the motive medium to the same ejector stage (3,9). The liquid phase (7,13) is supplied to a feeding device (19,24), such as to a pump. Alternatively the liquid phase (7,13) may be supplied directly to the ejector stage (3,9).

The pressure of the motive medium (2) is 1.3-50 bar in the first ejector stage (3). The pressure of the motive medium (8) is 3-300 bar in the second ejector stage (9).

Sodium carbonate or other suitable additive is added as an additive (14,15) for increasing a bonding of desired impurities to a liquor and/or increasing a capture of desired impurities in each separation stage (5,11). The additive may be added the mixture (4,10) before the separation stage (5,11). Alternatively, a make-up additive may be added before the separation stage (5,11).

The apparatus comprises a long pipe or tube which has enough residence time to allow dissolving a desired part of the gas into the liquid and through which the mixture (4,10) flows after the ejector stage (3,9).

A part of the liquid phase (7,13) may be discharged after the separation stage (5,11). Water (20,25) may be removed from the liquid phase (7,13) after the separation stage (5,11).

In the process, the gas is compressed and purified by the motive medium (2,8) in the ejectors so that pressure of the gas is increased from a starting pressure to a first pressure level in the first ejector stage (3) and pressure of the gas is increased from the first pressure level to a final pressure level, such as to a synthesis gas pressure, in the second ejector stage (9). The pressure of the gas is increased from the starting pressure to 1.1-3.0 bar in the first ejector stage (3). The pressure of the gas is increased from the first pressure level to the final pressure level which is 2-150 bar. Preferably, the gas (1), or alternatively the motive medium (2), comprises carbon dioxide as an impurity. The carbon dioxide can be removed from the gas in the process.

Example 3

Figure 3:
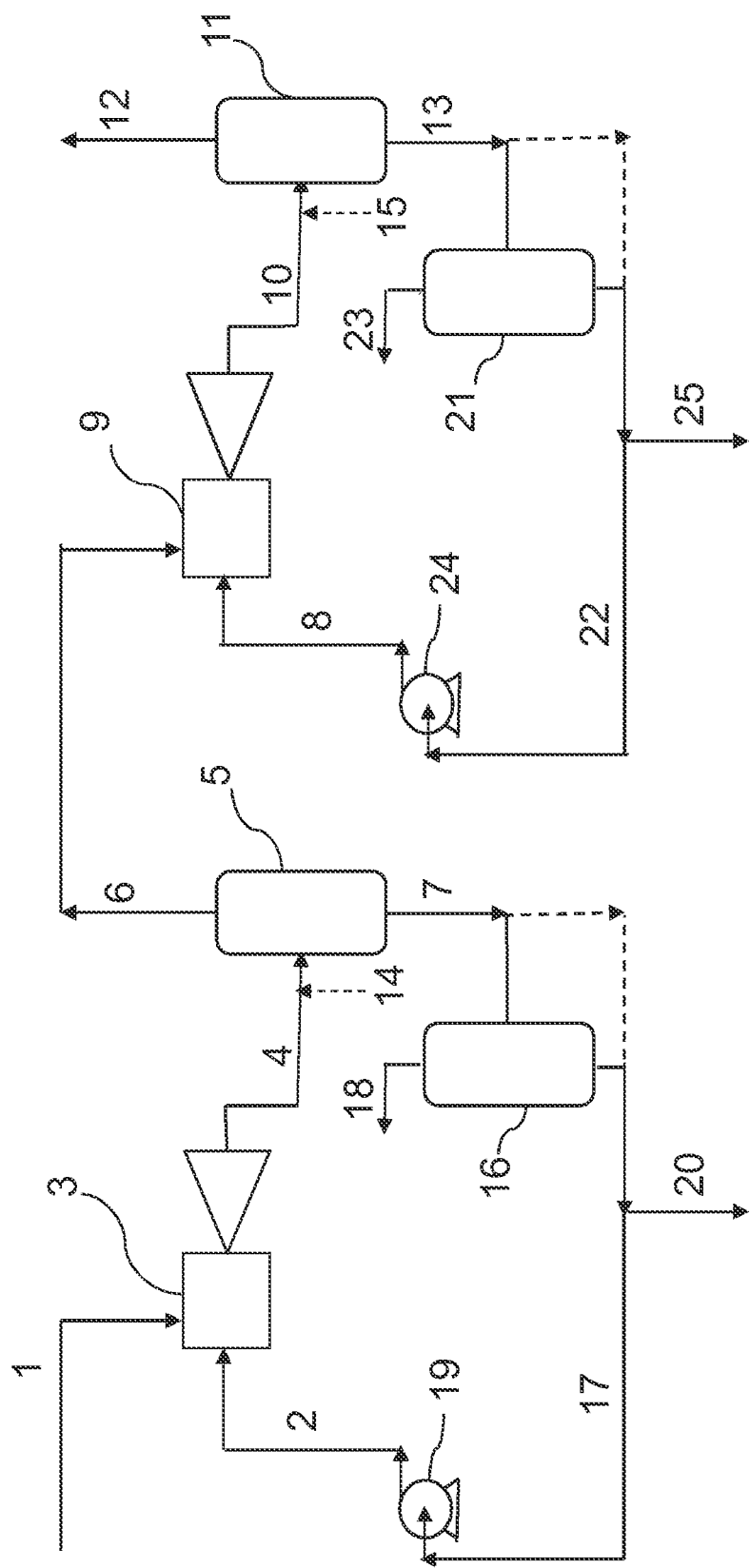
FIG. 3 is a flow chart illustration of a method according to another embodiment.

FIG. 3 presents the process according to the invention for purifying and pressurizing the gas.

In the process, a gas (1) is treated in a multistage treatment comprising at least two ejector stages (3,9). A motive medium (2) which is high pressure liquid, such as water, is injected to a liquid motivated ejector of the first ejector stage (3) and the gas (1) is sucked into the same ejector in which the gas is mixed with the motive medium for forming a mixture (4) of liquid phase and gas phase. The mixture may comprise vapor about 40% by volume and liquid about 60% by volume. At least a part of the gas phase (6) is separated from the mixture (4) in the separation stage (5) and at least a part of the gas phase (6) is supplied to a vapor ejector of the second ejector stage (9). A second motive medium (8) which is high pressure steam, such as water steam, is injected to the ejector and the gas phase (6) is sucked into the same ejector in which the gas phase is mixed with the second motive medium for forming a second mixture (10). The second mixture (10) may be condensed after the second ejector stage (9). At least a part of the gas phase (12) of the second mixture (10) is separated. The apparatus comprises at least one second separation device (11) for separating at least a part of the gas phase (12) from the second mixture (10).

The pressure of the motive medium (2) is 1.3-50 bar in the first ejector stage (3). The pressure of the motive medium (8) is 3-300 bar in the second ejector stage (9).

Sodium carbonate or other suitable additive is added as an additive (14,15) for increasing a bonding of desired impurities to a liquor and/or increasing a capture of desired impurities in each separation stage (5,11). The additive may be added the mixture (4,10) before the separation stage (5,11). Alternatively, a make-up additive may be added before the separation stage (5,11).

The apparatus may comprise a long pipe or tube which has enough residence time to allow dissolving a desired part of the gas into the liquid and through which the mixture (4,10) flows after the ejector stage (3,9).

At least a part of the liquid phase (7,13) separated in the separation stage (5,11) is fed as the motive medium to the same ejector stage (3,9). The liquid phase (7,13) is treated in an additional treatment stage (16,21), such as an additional separation, after the separation stage (5,11) for removing acid gas (18,23), e.g. carbon dioxide, and optionally hydrogen sulphide. The apparatus comprises additional separators (16,21) for treating the liquid phase. The carbon dioxide can be recovered from the liquid phase.

The liquid phase (17,22) is supplied from the additional treatment stage (16,21) or directly from the separation stage (5,11) to a feeding device (19,24), such as a pump, or alternatively to the ejector stage (3,9).

A part of the purified liquid phase (17,22) may be recovered after the additional treatment stage (16,21). Water (20,25) may be removed from the liquid phase (7,13,17,22).

In the process, the gas is compressed and purified by the motive medium (2,8) in the ejectors so that pressure of the gas is increased from a starting pressure to a first pressure level in the first ejector stage (3) and pressure of the gas is increased from the first pressure level to a final pressure level, such as to a synthesis gas pressure, in the second ejector stage (9). The pressure of the gas is increased from the starting pressure to 1.1-3.0 bar in the first ejector stage (3). The pressure of the gas is increased from the first pressure level to the final pressure level which is 2-150 bar. The gas (1) and/or the motive medium (2) comprise at least carbon dioxide as an impurity.

Example 4

Figure 4:
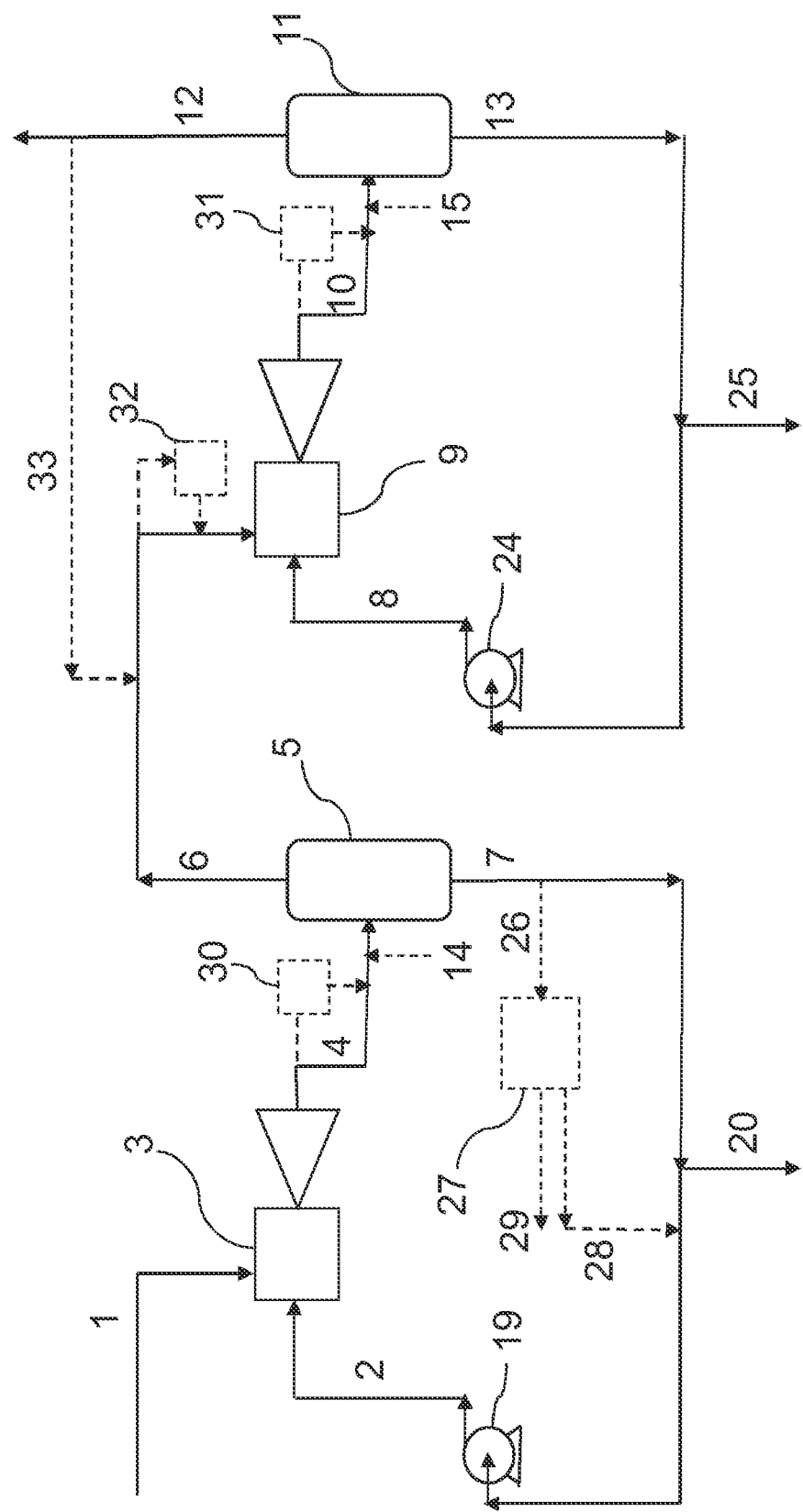
FIG. 4 is a flow chart illustration of a method according to another embodiment.

FIG. 4 presents the process according to the invention for purifying and pressurizing the gas.

In the process, a gas (1) is treated in a multistage treatment comprising at least two ejector stages (3,9). A motive medium (2) which is high pressure liquid, such as water, is injected to a liquid motivated ejector of the first ejector stage (3) and the gas (1) is sucked into the same ejector in which the gas is mixed with the motive medium for forming a mixture (4) of liquid phase and gas phase. The mixture may comprise vapor about 40% by volume and liquid about 60% by volume. At least a part of the gas phase (6) is separated from the mixture (4) in the separation stage (5) and at least a part of the gas phase (6) is supplied to a vapor ejector of the second ejector stage (9). A second motive medium (8) which is high pressure steam, such as water steam, is injected to the ejector and the gas phase (6) is sucked into the same ejector in which the gas phase is mixed with the second motive medium for forming a second mixture (10). The second mixture (10) may be condensed after the second ejector stage (9). At least a part of the gas phase (12) of the second mixture (10) is separated. The apparatus comprises at least one second separation device (11) for separating at least a part of the gas phase (12) from the second mixture (10). At least a part (33) of the gas phase (12) separated in the second separation stage (11) may be recirculated back to the second ejector stage (9).

The pressure of the motive medium (2) is 1.3-50 bar in the first ejector stage (3). The pressure of the motive medium (8) is 3-300 bar in the second ejector stage (9).

Sodium carbonate or other suitable additive is added as an additive (14,15) for increasing a bonding of desired impurities to a liquor and/or increasing a capture of desired impurities in each separation stage (5,11). The additive may be added the mixture (4,10) before the separation stage (5,11). Alternatively, a make-up additive may be added before the separation stage (5,11).

The apparatus may comprise a long pipe or tube which has enough residence time to allow dissolving a desired part of the gas into the liquid and through which the mixture (4,10) flows after the ejector stage (3,9).

At least a part of the liquid phase (7,13) separated in the separation stage (5,11) is fed as the motive medium to the same ejector stage (3,9). The liquid phase (7,13) is supplied from the separation stage (5,11) to a feeding device (19,24), such as a pump, or alternatively to the ejector stage (3,9).

A part of the liquid phase (7,13) may be discharged after the separation stage (5,11). Water (20,25) may be removed from the liquid phase (7,13) after the separation stage (5,11).

In the process, the gas is compressed and purified by the motive medium (2,8) in the ejectors so that pressure of the gas is increased from a starting pressure to a first pressure level in the first ejector stage (3) and pressure of the gas is increased from the first pressure level to a final pressure level, such as to a synthesis gas pressure, in the second ejector stage (9). The pressure of the gas is increased from the starting pressure to 1.1-3.0 bar in the first ejector stage (3). The pressure of the gas is increased from the first pressure level to the final pressure level which is 2-150 bar. The gas (1) and/or the motive medium (2) may comprise carbon dioxide as an impurity. The carbon dioxide can be removed from the gas in the process.

At least a part of the first mixture (4) of the liquid phase and gas phase may be supplied via at least one reactor (30) in which the mixture is treated before the separation stage (5) in order to form a chemical compound and/or improve a recovery of a desired component. At least a part of the gas phase (6) separated in the first separation stage (5) may be supplied via at least one reactor (32) in which the gas phase is treated before the second ejector stage (9) in order to form a chemical compound and/or improve a recovery of a desired component. At least a part of the second mixture (10) may be supplied via at least one reactor (31) in which the mixture is treated before the separation stage (11) in order to form a chemical compound and/or improve a recovery of a desired component. The apparatus comprises at least one reactor for treating the two-phase mixture (4,10) of the liquid phase and gas phase or the gas phase (6).

At least a part (26) of the liquid phase (7) which comprises sodium bicarbonate may be treated in an additional treatment stage (27) after the first separation stage (5) for removing or recovering sodium bicarbonate from the liquid phase. The sodium bicarbonate (29) can be recovered from the liquid phase flow (26) in connection with the treatment stage (27). A treated flow (28) is fed to the stream of the liquid phase (7), or alternatively directly to the feeding device (19) or the ejector stage (3). The treated flow (28) may comprise sodium carbonate.

Example 5

In this example, the gas can be pressurized and purified by means of process which comprises a vapor ejector as an ejector in the first ejector stage (3) and a liquid motivated ejector as an ejector in the second ejector stage (9). A first motive medium (2) which is high pressure steam, such as water steam, is injected to the vapor ejector and the gas (1)

is sucked into the same ejector in which the gas is mixed with the first motive medium for forming a mixture (4) comprising at least gas phase. At least a part of the gas phase (6) is supplied to the liquid motivated ejector of the second ejector stage (9). The first motive medium (2) is vaporized before the first ejector stage (3). A second motive medium (8) which is high pressure liquid, such as water, is injected to the liquid motivated ejector of the second ejector stage (9) and the gas phase (6) is sucked into the same ejector in which the gas phase is mixed with the motive medium for forming a second mixture (10) of liquid phase and gas phase.

The ejector arrangement of this example can be used in any process according to examples 1-4.

Example 6

Figure 5:
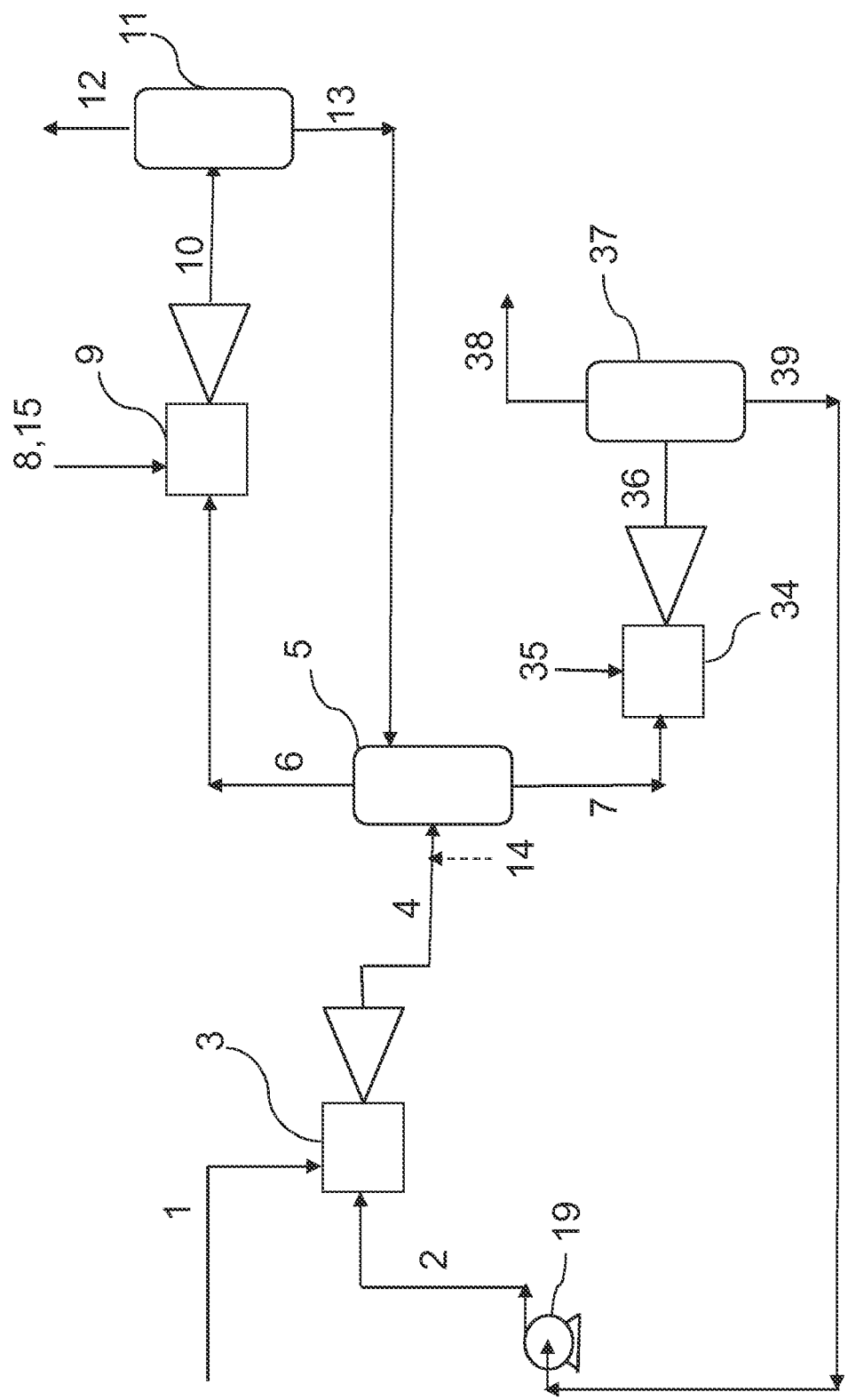
FIG. 5 is a flow chart illustration of a method according to another embodiment.

FIG. 5 presents the process according to the invention for purifying and pressurizing the gas.

In the process, a gas (1) is treated in a multistage treatment comprising three ejector stages (3,9,34). A motive medium (2) which is high pressure liquid is injected to a liquid motivated ejector of the first ejector stage (3) and the gas (1) is sucked into the same ejector in which the gas is mixed with the motive medium for forming a mixture (4) of liquid phase and gas phase. Further, the mixture (4) comprises an additive, such as $Na_2CO_3$, for providing a reaction between the additive and impurities, e.g. $CO_2$ and $H_2S$, of the gas feed (1). At least a part of the gas phase (6) is separated from the mixture (4) in the separation stage (5) and at least a part of the gas phase (6) is supplied to an ejector of the second ejector stage (9) which is a purification stage of the gas phase. A second motive medium (8) which comprises at least an additive (15), such as $Na_2CO_3$— or NaOH-solution or ammonia solution, is injected to the ejector and the gas phase (6) is supplied into the same ejector in which the gas phase is mixed with the second motive medium for forming a second mixture (10). The second mixture (10) may be condensed after the second ejector stage (9). At least a part of the gas phase (12) of the second mixture (10) is separated.

The apparatus comprises at least one second separation device (11) for separating at least a part of the gas phase (12) from the second mixture (10). A purified gas (12), such as methane, is formed and recovered. At least a part of the liquid phase (13) separated in the second separation stage (11) is supplied back to the first separation stage (5).

Further, the liquid phase (7) of the mixture (4) is separated in the first separation stage (5) which comprises at least a gas/liquid separation device, for example at 1.3 bar and at temperature of 40° C.

The liquid phase (7) is supplied to an ejector of the third ejector stage (34). An air as a third motive medium (35) is injected to the ejector (34) at about 1 bar and the liquid phase (7) is supplied into the same ejector in which the liquid phase is mixed with the third motive medium for forming a third mixture (36). The third mixture (36) is supplied to a regeneration stage (37) for removing carbon dioxide, and optionally hydrogen sulphide. In one embodiment, the pressure is about 1 bar and temperature is about 40° C. in the regeneration (37). At least a part of $CO_2$ containing gas (38) of the third mixture (36) is discharged from the reactor (37). At least a part of a liquid phase (39) of the third mixture (36) is supplied as the motive medium to the first ejector stage (3). The liquid phase (39) from the regeneration reactor (37) is fed by means of a feeding device (19), such as a pump, or directly to the first ejector stage (3). When the liquid phase is fed by means of the pump to the first ejector stage so the pressure of the motive medium (2) is about 2.5 bar in the first ejector stage (3). A part of the liquid phase (39) may be recovered after the regeneration reactor (37).

The additive can be recirculated with the liquid phase (39) to the motive medium (2) of the first ejector stage (3). An additional or make-up additive (14) may be added to the mixture (4) for increasing a bonding of desired impurities to a liquor and/or increasing a capture of desired impurities in the first separation stage (5).

The apparatus may comprise a long pipe or tube which has enough residence time to allow dissolving or desorbing a desired part of the gas into the liquid and through which the mixture (4,10,36) flows after the ejector stages (3,9,34).

Further, the gas may be compressed by the motive medium in the ejectors. For example, pressure of the gas can be increased from a starting pressure, 1 bar, to a first pressure level, 1.3 bar, in the first ejector stage (3).

By means of this process, the biogas can be purified, methane emissions can be decreased and pure $CO_2$ can be produced.

Example 7

Figure 6:
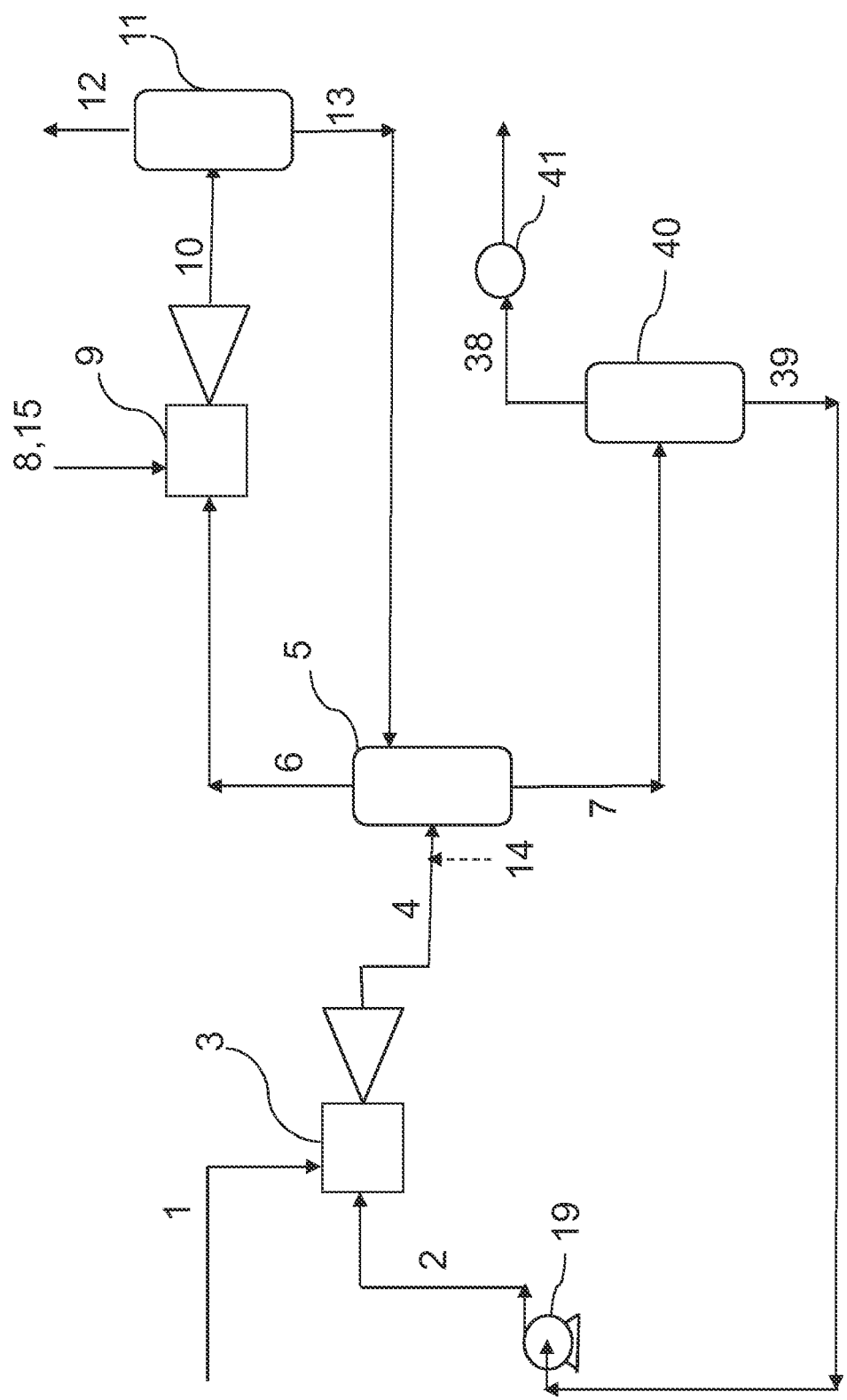
FIG. 6 is a flow chart illustration of a method according to another embodiment.

FIG. 6 presents the process according to the invention for purifying and pressurizing the gas.

In the process, a gas (1) is treated in a multistage treatment comprising two ejector stages (3,9). A motive medium (2) which is high pressure liquid is injected to a liquid motivated ejector of the first ejector stage (3) and the gas (1) is sucked into the same ejector in which the gas is mixed with the motive medium for forming a mixture (4) of liquid phase and gas phase. Further, the mixture (4) comprises an additive, such as $Na_2CO_3$, for providing a reaction between the additive and impurities, e.g. $CO_2$ and $H_2S$, of the gas feed (1). At least a part of the gas phase (6) is separated from the mixture (4) in the separation stage (5) and at least a part of the gas phase (6) is supplied to an ejector of the second ejector stage (9) which is a purification stage of the gas phase. A second motive medium (8) which comprises at least an additive (15), such as $Na_2CO_3$— or NaOH-solution or ammonia solution, is injected to the ejector and the gas phase (6) is supplied into the same ejector in which the gas phase is mixed with the second motive medium for forming a second mixture (10). The second mixture (10) may be condensed after the second ejector stage (9). At least a part of the gas phase (12) of the second mixture (10) is separated. The apparatus comprises at least one second separation device (11) for separating at least a part of the gas phase (12) from the second mixture (10). A purified gas (12), such as methane, is formed and recovered. At least a part of the liquid phase (13) separated in the second separation stage (11) is supplied back to the first separation stage (5).

Further, the liquid phase (7) of the mixture (4) is separated in the first separation stage (5) which comprises at least a gas/liquid separation device, for example at 1.3 bar and at temperature of 40° C.

The liquid phase (7) is supplied to a regeneration stage (40) for removing carbon dioxide, and optionally hydrogen sulphide. The regeneration is carried out under vacuum, such as at about 0.1 bar, and at temperature of about 40° C. At least a part of $CO_2$ containing gas (38) is discharged from the reactor (40) by means of a pump or the like (41), such as a vacuum pump or an ejector. At least a part of a liquid phase (39) is supplied as the motive medium to the first ejector stage (3). The liquid phase (39) from the regeneration reactor (40) is fed by means of a feeding device (19), such as a pump, or directly to the first ejector stage (3). When the liquid phase is fed by means of the pump to the first ejector stage so the pressure of the motive medium (2) is about 2.5 bar in the first ejector stage (3). A part of the liquid phase (39) may be recovered after the regeneration reactor (40).

The additive can be recirculated with the liquid phase (39) to the motive medium (2) of the first ejector stage (3). An additional or make-up additive (14) may be added to the mixture (4) for increasing a bonding of desired impurities to a liquor and/or increasing a capture of desired impurities in the first separation stage (5).

The apparatus may comprise a long pipe or tube which has enough residence time to allow dissolving a desired part of the gas into the liquid and through which the mixture (4,10) flows after the ejector stages.

Further, the gas may be compressed by the motive medium in the ejectors. For example, pressure of the gas can be increased from a starting pressure, 1 bar, to a first pressure level, 1.3 bar, in the first ejector stage (3).

By means of this process, the biogas can be purified, methane emissions can be decreased and pure $CO_2$ can be produced.

Example 8

Figure 7:
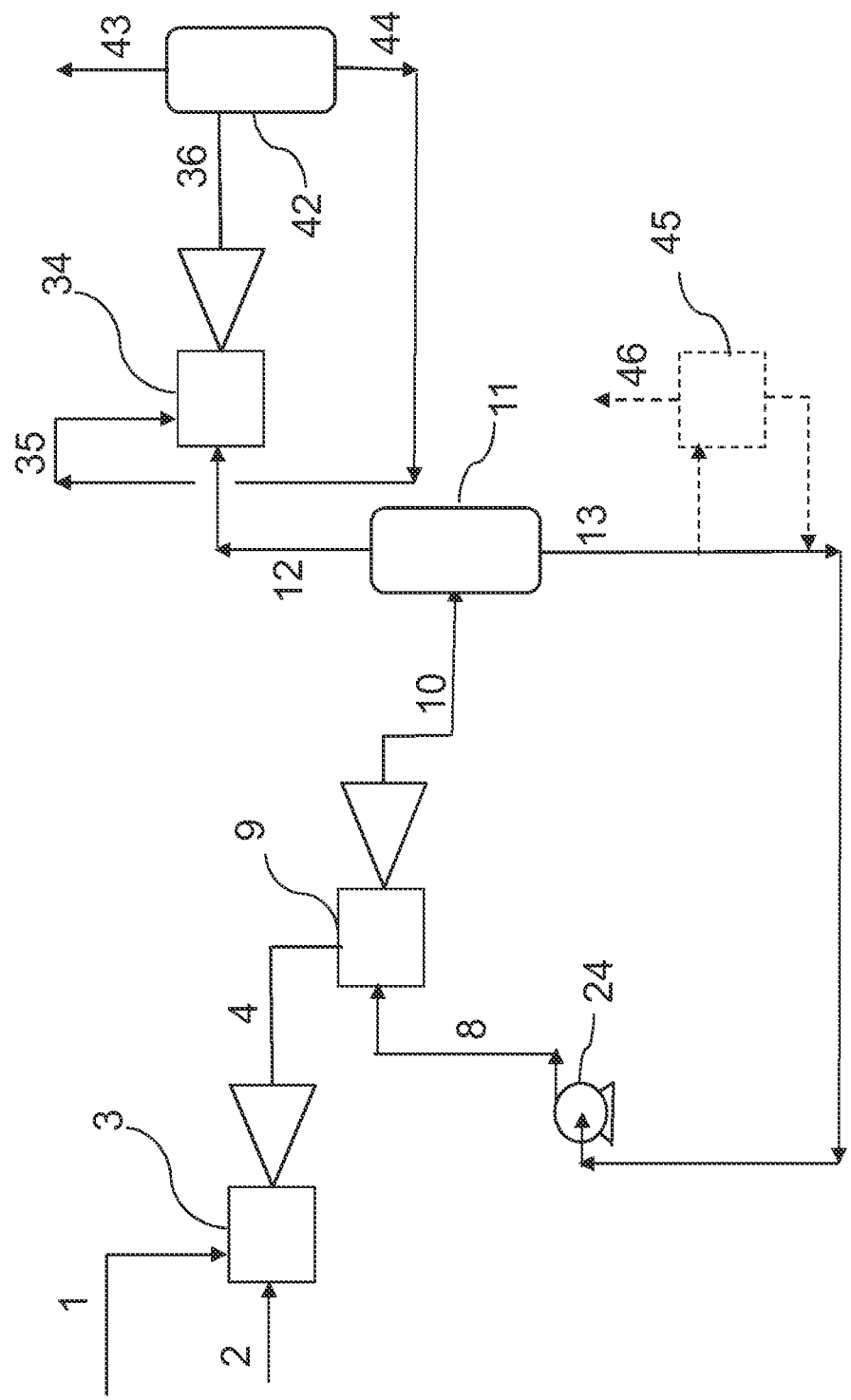
FIG. 7 is a flow chart illustration of a method according to another embodiment.

FIG. 7 presents the process according to the invention for purifying and pressurizing the gas.

In the process, a gas (1) is treated in a multistage treatment comprising three ejector stages (3,9,34). The gas is supplied to an ejector of the first ejector stage (3). A motive medium (2) which is hydrogen, 40 bar, from an electrolysis is injected to the ejector of the first ejector stage (3) and the gas (1) is sucked into the same ejector in which the gas is mixed with the motive medium for forming a mixture (4) comprising at least gas phase. The mixture (4) is supplied to an ejector of the second ejector stage (9). A motive medium (8) which is high pressure liquid is injected to a liquid motivated ejector of the second ejector stage (9) and the mixture (4) is sucked into the same ejector in which the mixture is mixed with the motive medium for forming a mixture (10) of liquid phase and gas phase. At least a part of the gas phase (12) is separated from the mixture (10) in the separation stage (11) which comprises a biological methanation reactor and a separation device and at least a part of the gas phase (12) is supplied to an ejector of the third ejector stage (34) which is a purification stage of the gas phase. A third motive medium (35) which comprises at least an additive, such as NaOH-solution or ammonia solution for providing a reaction between the additive and impurities, e.g. $CO_2$ and $H_2S$, of the gas phase (12), is injected to the ejector and the gas phase (12) is supplied into the same ejector in which the gas phase is mixed with the third motive medium for forming a third mixture (36). At least a part of the gas phase (43) of the third mixture (36) is separated in a separation device (42) for separating at least a part of the purified gas (43) from the third mixture (36). A purified gas (43), such as methane, is formed and recovered. At least a part of the liquid phase (44) separated in the third separation stage (42) is supplied back as the motive medium (35) to the third ejector stage (34). Alternatively, the apparatus may comprise a thermal methanation reactor before the third separation stage (42) or to replace the third separation stage (42). In the thermal methanation the third mixture (36) can be treated at 27 bar and at temperature of over 300° C. Then vaporized water with the heat from the methanation can be supplied as the motive medium (35) to the third ejector stage (34).

The additive can be recirculated with the liquid phase (44) or steam of the thermal methanation to the motive medium (35) of the third ejector stage (34). An additional or make-up additive may be added for increasing a bonding of desired impurities to a liquor and/or increasing a capture of desired impurities.

Further, the liquid phase (13) of the mixture (10) is separated in the combined methanation and separation stage (11) which is carried out for example at 5.5 bar.

At least a part of the liquid phase (13) is recirculated as the motive medium (8) to the ejector of the second ejector stage (9). The liquid phase (13) is fed by means of a feeding device (24), such as a pump, or directly to the second ejector stage (9). When the liquid phase is fed by means of the pump to the second ejector stage, the pressure of the motive medium (8) can be increased. A part of the liquid phase (13) may be recovered after the separation stage.

The liquid phase (13) may be treated before supplying to the motive medium (8). The liquid phase (13) may be treated by means of a gas stripping (45). Then $CO_2$ containing gas (46) can be discharged.

The apparatus may comprise a long pipe or tube which has enough residence time to allow dissolving a desired part of the gas into the liquid and through which the mixture (4,10,36) flows after the ejector stages (3,9,34).

Further, the gas may be compressed by the motive medium in the ejectors. For example, pressure of the gas can be increased from a starting pressure, 1 bar, to a final pressure level, 5-6 bar, by three ejector stages.

By means of this process, the faster methanation can be provided, when small bubble size results in good mass transfer after the ejectors. Further, biogas can be purified, methane emissions can be decreased and pure $CO_2$ can be produced.

Example 9

Figure 8:
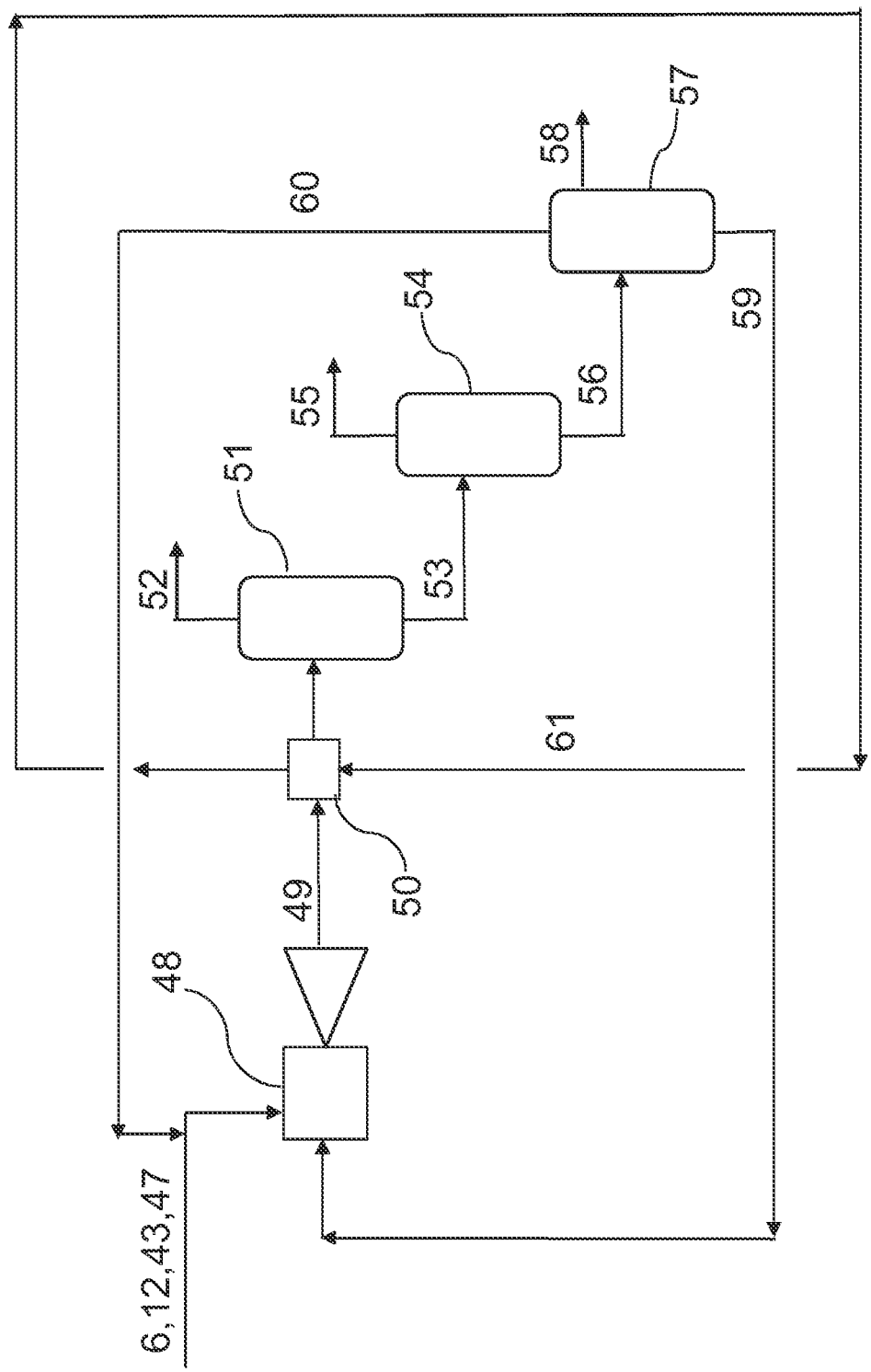
FIG. 8 is a flow chart illustration of a method according to another embodiment.

FIG. 8 presents the process for treating the purified gas and/or biogas.

The purified gas (12,43) which is formed according to any one of previous example and the desired biogas (47) are fed to the ejector (48) of the LNG process. Alternatively, only the biogas (47) is fed as a feed to an ejector (48) of the LNG process.

A motive medium of the ejector (48) is a liquid or a vaporized liquid from a LNG vessel (57). In the ejector, a composition (49) is formed. The pressure after the ejector is about 100 bar. The composition is cooled (50) by means of a cooling liquid (61), such as a refrigerant, after the ejector (48). The refrigerant, e.g. ethane, could be compressed back after the cooling at low pressure 1 bar to high pressure, e.g. 43 bar, by using multiple ejectors and by employing a part of vaporized refrigerant itself at 100 bar as motive medium and by condensating the ejector outlet product with cooling water. The condensed composition is supplied to a first gas-liquid separation device (51) in which a gas fraction (52) and a liquid fraction (53) are separated, at pressure of 30 bar and at temperature of about 90° C. The liquid fraction (53) is supplied to a second gas-liquid separation device (54) in which a gas fraction (55) and a liquid fraction (56) are separated, at pressure of 10 bar and at temperature of about 100° C. The liquid fraction (56) is supplied to a LNG vessel (57), in which pressure is about 1 bar and temperature is about 160° C. and from which LNG product (58) can be recovered. A boil-off gas (60) can be recirculated to the purified gas and/or biogas which are fed to the ejector. The boil off gas (60) and feed stream (6,1243,47) can be pre-compressed in an additional ejector stage or stages before the ejector stage (48) by employing the gases (52,55) at higher pressure of 30 and 10 bar as motive medium. The liquid (59) can be recirculated as the motive medium by means of a pump from the LNG vessel (57) to the ejector (48). The liquid (59) can be vaporized before the ejector.

The devices and equipments used in this invention are known per se in the art, and therefore they are not described in any more detail in this context.

The method and apparatus according to the invention is suitable in different embodiments for purifying and pressurizing different kinds of gases.

The invention is not limited merely to the examples referred to above; instead many variations are possible within the scope of the inventive idea defined by the claims.

The invention claimed is:

1. A method for purifying gas, wherein a gas is treated in a multistage treatment comprising at least two ejector stages for absorbing the gas to a liquid and pressurizing the gas simultaneously, and the method comprises,
 providing a pressurized motive medium which comprises liquid, steam or gaseous agent at high pressure, wherein the pressure of the motive medium is 1.3-100 bar if the motive medium is liquid and wherein the pressure of the motive medium is 3-300 bar if the motive medium is steam,
 injecting the pressurized motive medium into at least one ejector of the first ejector stage, and sucking the gas into the same ejector in which the gas is mixed with the motive medium for forming a mixture comprising a gas phase and a liquid phase
 arranging the mixture to flow through a pipe or tube which has enough residence time to allow dissolving a desired part of the gas into the liquid after the ejector stage,
 separating at least a part of the gas phase from the mixture in a separation stage after the first ejector stage to form a liquid phase,
 supplying at least a part of the gas phase to a second or later ejector stage which comprises at least one ejector so that a second or later motive medium which comprises liquid, steam or gaseous agent is injected to the ejector and the gas phase is sucked into the same ejector in which the gas phase is mixed with the second or later motive medium for forming a second or later mixture, and
 separating at least a part of the gas phase from the second or later mixture in a separation stage after the second or later ejector stage, and forming a purified gas,
 treating at least a part of the separated liquid phase by a regeneration for removing carbon dioxide and other impurities from the liquid phase and/or for recovering a desired chemical compound from the liquid phase at least after the first separation stage, and supplying at least a part of the regenerated liquid phase back to the motive medium of the same first ejector stage, and the regeneration is carried out under vacuum, and
 at least one of the mixtures comprises an additive which contains sodium carbonate, potassium carbonate or combination thereof for removing impurities of the gas, and the additive is added for increasing a bonding of desired impurities to the liquid and/or increasing a capture of desired impurities in the separation stages;
 wherein, the pressure of the gas is increased from a starting pressure to 1.1-3.0 bar in the first ejector stage and from the first pressure level to the final pressure level of 2-150 bar in the second or later ejector stage.

2. The method according to claim 1, wherein high pressure liquid is used as motive medium in the first ejector stage and/or in the second or later ejector stage.

3. The method according to claim 1, wherein high pressure steam is used as motive medium in the first ejector stage and/or in the second or later ejector stage.

4. The method according to claim 1, wherein the pressure of the motive medium is 1.3-50 bar if the motive medium is liquid.

5. The method according to claim 1, wherein the pressure of the motive medium is 20-100 bar if the motive medium is steam.

6. The method according to claim 1, wherein the method comprises 2-8 ejector stages.

7. The method according to claim 1, wherein the gas is com-pressed by the motive medium in the ejectors so that pressure of the gas is increased to a first pressure level in the first ejector stage and pressure of the gas is increased from the previous pressure level to a second or later pressure level in the second or later ejector stage.

8. The method according to claim 1, wherein at least a part of the gas phase of the mixture is separated in the separation stage.

9. The method according to claim 1, wherein at least a part of the liquid phase separated in the separation stage is fed as the motive medium to the at least two ejector stages.

10. The method according to claim 1, wherein the liquid phase is treated in an additional treatment stage after the separation stage for removing and/or recovering a desired compound from the liquid phase.

11. The method according to claim 1, wherein the purified gas is treated, post-treated or refined.

* * * * *